(12) United States Patent
Kawase et al.

(10) Patent No.: US 6,519,407 B1
(45) Date of Patent: Feb. 11, 2003

(54) PROCESS FOR THE FABRICATION OF AN OPTICAL INTERCONNECTION APPARATUS

(75) Inventors: Ritsu Kawase, Shizuoka (JP); Ken Sukegawa, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/714,096

(22) Filed: Nov. 17, 2000

(30) Foreign Application Priority Data

Nov. 18, 1999 (JP) .............................. 11-327592

(51) Int. Cl.⁷ .............................. G02B 6/00; G02B 6/30
(52) U.S. Cl. ........................................ 385/147; 385/49
(58) Field of Search ................. 385/137, 114, 385/51, 80, 49, 147

(56) References Cited

U.S. PATENT DOCUMENTS 4,957,345 A * 9/1990 Sakuma et al. ............. 385/103
5,204,925 A   4/1993 Bonanni et al.
5,999,674 A * 12/1999 Yui et al. ..................... 385/49

FOREIGN PATENT DOCUMENTS

JP        2574611        1/1997

* cited by examiner

*Primary Examiner*—Brian Sircus
*Assistant Examiner*—Chandrika Prasad
(74) *Attorney, Agent, or Firm*—McDermott, Will & Emery

(57) ABSTRACT

A process is disclosed to fabricate an optical interconnection apparatus in which plural optical fibers having end portions are provided at ports of the optical interconnection apparatus for optical interconnection, the plural optical fibers are routed in a two-dimensional plane such that a routing pattern having at least one type of parts selected from overlapping parts, curved parts or fiber pitch change partsis formed and the end portions of the optical fibers are located extending out from the ports of the optical interconnection apparatus and are protected by protective boots. According to the process, an edge-dam member, which is provided with protruding portions for forming protective boots, is formed along or in a vicinity of a peripheral edge of a base film for supporting the thus-routed optical fibers thereon. A resin material is filled inside the edge-dam member such that a protective resin layer is formed to hold the optical fibers in place and the protective boots are formed on the end portions of the optical fibers.

12 Claims, 3 Drawing Sheets

PROCESS FOR THE FABRICATION OF AN OPTICAL INTERCONNECTION APPARATUS

BACKGROUND OF THE INVENTION a) Field of the Invention

This invention relates to optical interconnection apparatuses (optical circuit boards) for interconnecting optical elements, components and/or devices used in optical communications or optical information processing, such as optical elements, optical circuit packages and optical circuit devices, and also to fabrication process thereof.

b) Description of the Related Art

To permit interconnections between plural optical elements in an optical circuit package or optical interconnections between plural optical circuit packages or between optical circuit devices on each of which optical circuit packages are mounted, these optical elements, optical circuit packages and optical circuit devices are provided at terminals thereof with optical connectors to interconnect them together via optical fibers. As these optical fibers have to be arranged with slack in this case, it is a current practice that, on an optical circuit package or inside and/or on a back side of an optical circuit device, intricately routed lines of the optical fibers extend overlapping one another in the form of a bird's nest and hence occupy a large space. For optical interconnection processes requiring such large space and substantial interconnecting labor for intricate routing as described above, simple methods have been proposed to solve these problems by routing optical fibers in a two-dimensional plane as desired. As is disclosed in JP 2,574,611 B, for example, it is proposed to use a sheet or base film with a pressure-sensitive adhesive coated thereon and to hold optical fibers in place by the pressure-sensitive adhesive.

According to these methods, the optical fibers held in place on the sheet or base film are strong against breakage by bending or the like owing to the arrangement of the sheet or base film, but the optical fibers located extending out from the sheet or base film are very fragile and are weak and easily broken by breaking such as bending. Especially at an edge of the sheet or base film, there is a significant difference in strength between the optical fibers held in place on the sheet or base film and the optical fibers located extending out from the sheet or base film, resulting in a problem that the optical fibers are easily broken in a vicinity of the edge of the sheet or base film when bent or otherwise stressed.

Especially, optical fibers located extending out from an optical interconnection apparatus require work such as polishing for the interconnection of a connector, assembling of the connector onto the optical fibers subsequent to the polishing, and interconnection to another optical apparatus or to a connector attached to the optical apparatus. During these work, stress is applied to end portions of the optical fibers, resulting in a problem that the optical fibers are easily broken at portions thereof located in the vicinity of an edge of a sheet or base film. Incidentally, it is proposed in JP 2,574,611 B to provide optical fibers with tabs at portions thereof, said portions being located extending out from a base film. These tabs, however, provides absolutely no solution to the breakage problem of the optical fibers which, when the optical fibers are bent, arises due to a difference in strength between inner portions of the optical fibers, said inner portions being held in place by the tabs on the edge of the base film, and outer portions of the optical fibers, said outer portions being located extending from the tabs.

SUMMARY OF THE INVENTION

This invention has been completed to solve the above-described problem of the conventional art. Described specifically, the present invention has as an object thereof the prevention of breakage of plural optical fibers in an optical interconnection apparatus in which the optical fibers extend overlapping one another as described above, which occurs when the optical fibers are bent or otherwise stressed during work such as endface polishing of the optical fibers for the interconnection of a connector, assembly of the connector onto the optical fibers after the endface polishing, and interconnection to another optical apparatus or to a connector attached to the optical apparatus, or during handling of the optical interconnection apparatus. It is therefore an object of the present invention to provide an optical interconnection apparatus, which provides optical fibers with strength in the vicinity of an edge of the optical interconnection apparatus and has excellent workability, and a fabrication process of the optical interconnection apparatus.

The present invention therefore provides a process for the fabrication of an optical interconnection apparatus in which plural optical fibers provided at ports thereof with end portions for optical interconnection are routed in a two-dimensional plane such that a routing pattern having at least one type of parts selected from overlapping parts, curved parts or fiber pitch change parts is formed and the end portions of the optical fibers, said end portions being located extending out from a main body of the optical interconnection apparatus, are protected by protective boots, which comprises:

- forming an edge-dam member, which is provided with protruding portions for forming protective boots, along or in a vicinity of a peripheral edge of a base film for supporting the thus-routed optical fibers thereon; and
- filling a resin material inside the edge-dam member such that a protective resin layer is formed to hold the optical fibers in place and the protective boots are formed on the end portions of the optical fibers.

DETAILED DESCRIPTION OF THE INVENTION AND PREFERRED EMBODIMENTS

The optical interconnection apparatus according to the present invention may or may not include a base film. When the base film is included, the support on which the routed optical fibers are supported serves as the base film. The below-described base film is therefore used. When the base film is not included, a release film as a temporary support or a resin film as a second resin protective film is used as the base film on which the routed optical fibers are supported serves as the base film. The plural optical fibers routed in the two-dimensional plane are held in place and protected by the protective resin layer. In this case, the protective resin layer can be formed by filling the resin material inside the edge-dam member arranged along or in the vicinity of the peripheral edge of the base film.

When the edge-dam member is formed, the protective boots can be formed by arranging protruding portions at locations where the protective boots are desired. It is therefore preferred to integrally form the protective boots with the same material as the edge-dam member at the same time as the formation of the edge-dam member. As a material for forming the protective boots, a nonwoven fabric formed of organic fibers, glass fibers or a sealing compound composed of a silicone, epoxy, urethane or acrylic resin is used.

The embodiments of the present invention will hereinafter be described in detail with reference to the accompanying drawings.

Figure 1:
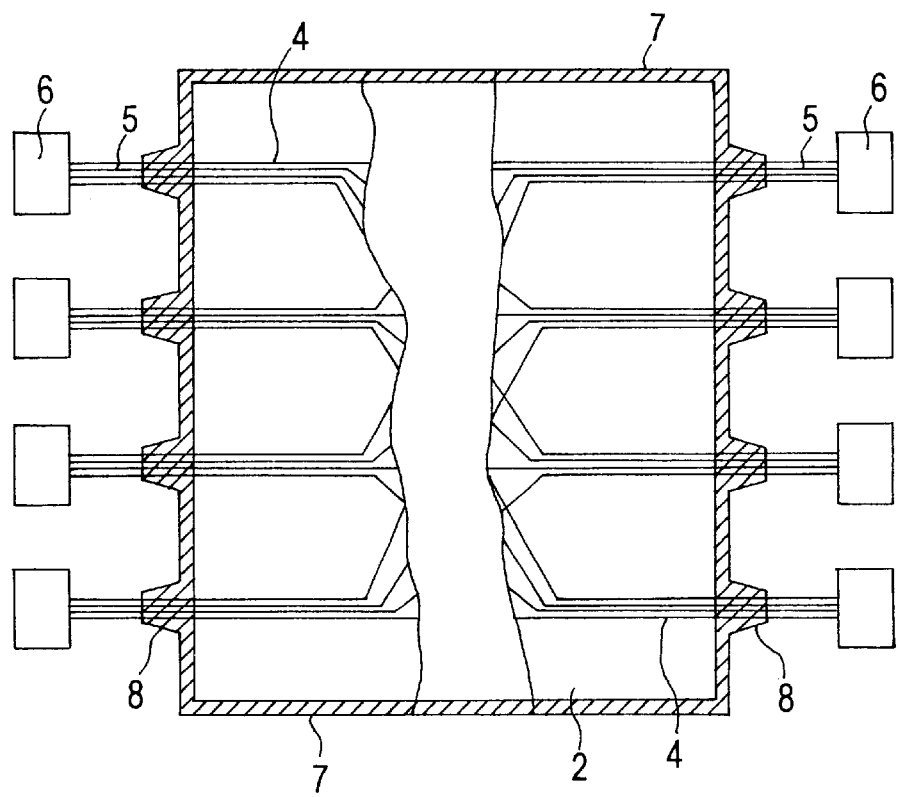
FIG. 1 is a partly broken-away top plan view of an illustrative optical interconnection apparatus fabricated by the process of the present invention.
Figure 2:
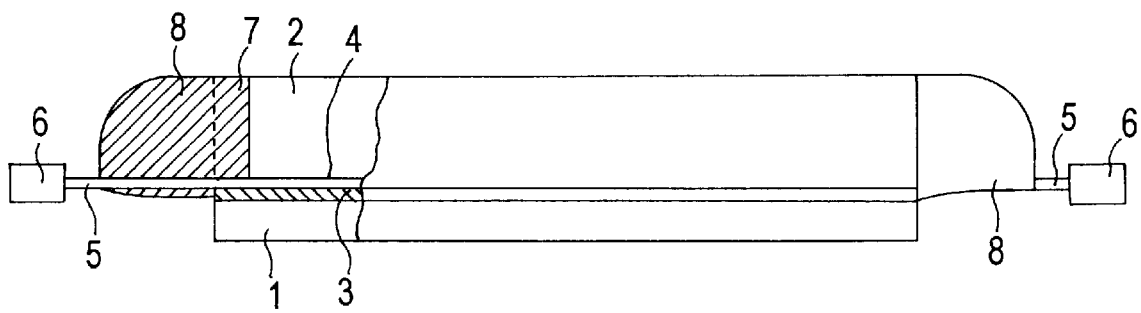
FIG. 2 is a partly broken-away front view of the illustrative optical interconnection apparatus shown in FIG. 1.

Referring first to FIG. 1 and FIG. 2, the illustrative optical interconnection apparatus fabricated by the process of the present invention will be described. Plural optical fibers 4 are routed in a two-dimensional plane on one side of a base film 1 via an adhesive layer 3. These optical fibers 4 are held in place and protected by a flexible protective resin layer 2 which was by filling a resin material inside an edge-dam member 7 arranged along a peripheral edge of the base film 1. Opposite terminals of the optical fibers 4 are formed into end portions 5 adapted to permit optical interconnections. Optical components 6, for example, optical connectors are interconnected to the end portions. In this embodiment, the routed plural optical fibers are put together into plural groups at edge port sections and extend out from the edge port sections. The end portions 5 of the optical fibers 4 are protected by flexible protective boots 8 at the edges of the base film. The flexible protective boots 8 in FIG. 2 were formed at the same time as the edge-dam member 7 and are integral with the edge-dam member. By the protective boots 8, the end portions 5 of the optical fibers at the edges of the base film are protected.

Figure 3:
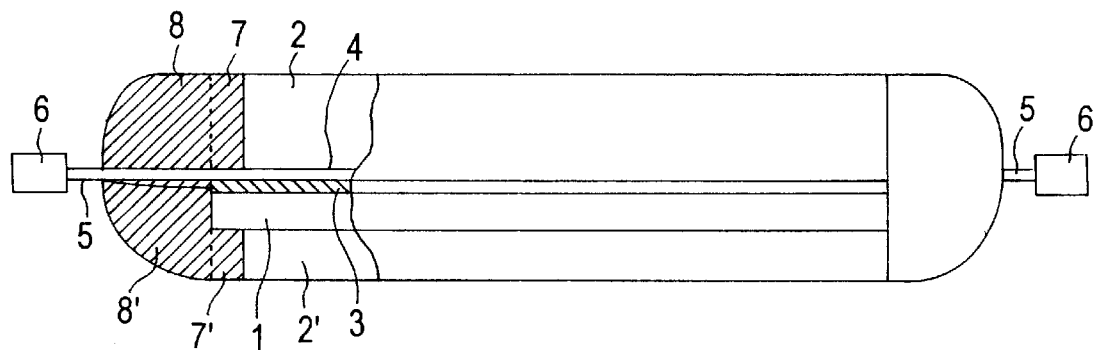
FIG. 3 is a partly broken-away front view of another illustrative optical interconnection apparatus fabricated by the process of the present invention.

Another illustrative optical interconnection apparatus fabricated by the process of the present invention will next be described with reference to FIG. 3, in which a protective resin layer 2' is also arranged on the other side of the base film 1 of FIG. 2. Similar to the protective resin layer 2, the protective resin layer 2' is formed by arranging an edge-dam member 7' along the peripheral edge of the base film 1 and filling a resin material inside the edge-dam member 7'. End portions 5 of optical fibers 4, which are put together in plural groups at end port sections and extend out from the port sections, are protected by protective boots 8, 8' formed integrally with the edge-dam members 7, 7', respectively. The protective boots 8 were formed at the same time as the formation of the edge-dam member 7, whereas the protective boots 8' were formed at the same time as the formation of the edge-dam member 7'.

Figure 4:
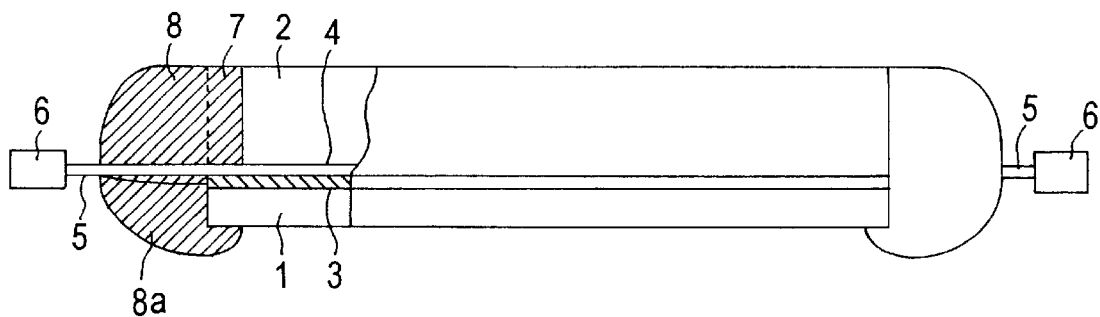
FIG. 4 is a partly broken-away front view of a further illustrative optical interconnection apparatus fabricated by the process of the present invention.

With reference to FIG. 4, the further illustrative optical interconnection apparatus fabricated by the process of the present invention will be described. In FIG. 4, protective boots 8 are formed in a similar manner as in FIG. 2 on one side of end portions 5 of optical fibers 4 put together in plural groups at end port sections of the optical interconnection apparatus and extending out from the end port sections, and additional protective boots 8a made of a material, which is the same as or similar to the material of the protective boots 8, are formed on the opposite side of the end portions 5.

Figure 5:
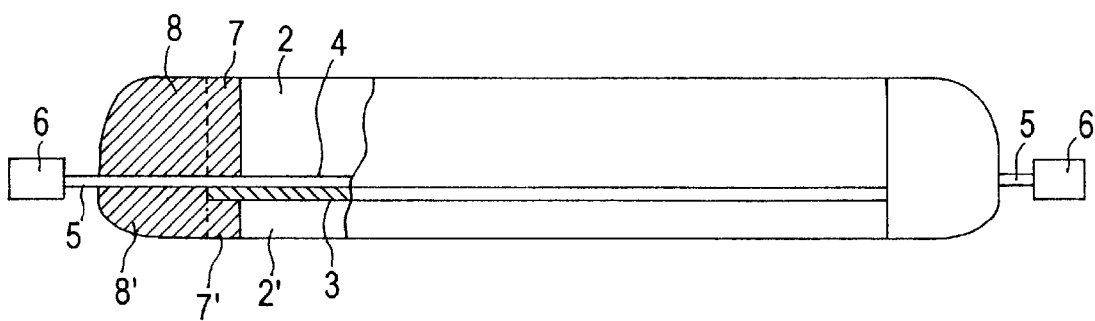
FIGS. 5 and 5A–5D are a partly broken-away front views of a still further illustrative optical interconnection apparatus and intermediate optical interconnection apparatus fabricated by the process of the present invention.
Figure 5A:
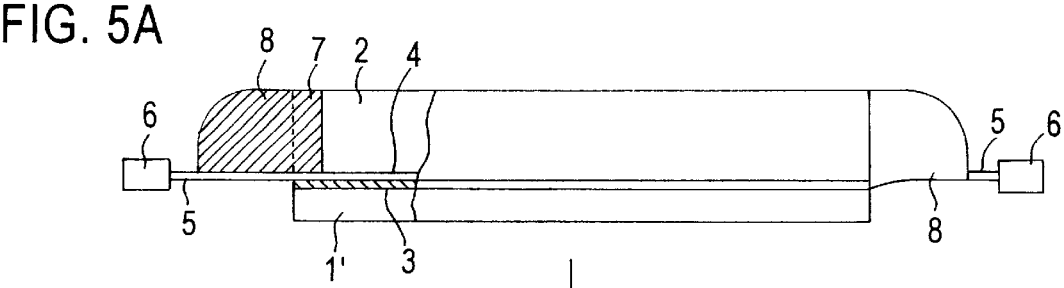
Figure 5B:
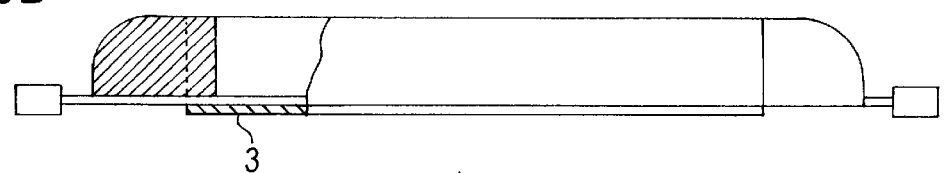
Figure 5C:
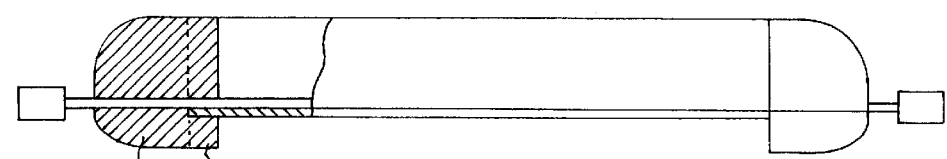
Figure 5D:
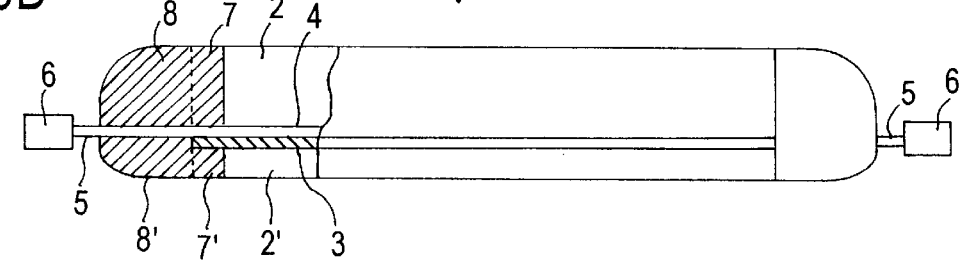

Referring next to FIGS. 5A–5D, a description will be made of the still further example of the optical interconnection apparatus, which was fabricated by the process of the present invention and does not include any base film. In FIG. 5A, plural optical fibers 4 are routed on an adhesive layer 3 arranged on a release film 1', and are held in place and protected by a protective resin layer 2 formed by filling a resin material inside an edge-dam member 7. The release film was removed subsequent to the formation of the protective resin layer (FIG. 5B), and a protective resin layer 2' is arranged over the exposed adhesive layer (FIG. 5D). Like the protective resin layer 2, the protective resin layer 2' was formed by arranging an edge-dam member 7' along a peripheral edge of the adhesive layer 3 and filling a resin material inside the edge-dam member 7', as shown in FIGS. 5C and 5D. Further, end portions 5 of the optical fibers 4, which are put together in groups at end port sections and extend out from the end port sections, are protected by protective boots 8, 8' which are formed integrally with the edge-dam members 7, 7'. The protective boots 8 were formed at the same time as the formation of the edge-dam member 7, whereas the protective boots 8' were formed at the same time as the formation of the edge-dam member 7', as shown in FIG. 5C.

In the fabrication process according to the present invention, no particular limitation is imposed on a base film for supporting the routed optical fibers when the optical interconnection apparatus includes the base film, insofar as the base film has a two-dimensional surface and flexibility. Base films usable in general electronic components or electric components are all usable including, for example, glass-epoxy resin composite bases, polyester films, polyimide films, and gels, rubbers, foams or the like of organic materials such as silicone, urethane resin or the like. It is to be noted that depending on the application purpose, the optical interconnection apparatus according to the present invention is not required to be flexible but may be stiff. For example, a base film made of a stiff high-molecular material, a ceramic base or the like can be used. The base film may be of any shape.

Optical fibers, which are to be routed in the present invention, can be suitably selected and used depending on the application purpose of the optical interconnection apparatus. For example, silica- or plastic-made single-mode optical fibers, multiple-mode optical fibers or the like can be used preferably. Carbon-coated optical fibers can also be used as preferred optical fibers.

As an adhesive for forming adhesive layers to route optical fibers, any adhesive can be used insofar as it has adhesiveness sufficient to retain the pattern of the optical fibers against tensions which may be produced when the routed optical fibers are bent. Usable examples can include various pressure-sensitive adhesive, thermoplastic adhesives and thermosetting adhesives, such as urethane-base adhesives, acrylic adhesives, epoxy adhesives, nylon-base adhesives, phenol-base adhesives, polyimide-base adhesives, vinyl adhesives, silicone-base adhesives, rubber-base adhesives, fluorinated epoxy adhesives and fluorinated acrylic adhesives. From the standpoint of readiness in routing optical fibers, pressure-sensitive adhesives and thermoplastic adhesive are used preferably.

In the present invention, the protective resin layer is arranged to hold in place and protect the optical fibers routed as described above. To form the protective resin layer, the edge-dam member is first arranged along or in the vicinity of the peripheral edge of the support such as the base film. In this case, the edge-dam member can usually be arranged along or in the vicinity of the entire peripheral edge of the base film. If optical components such as optical connectors, optical modules or optical devices are mounted in the vicinity of the peripheral edge of the base film and such optical components play a role as edge-dam members, the edge-dam member can be omitted at a location where the optical component is mounted.

No particular limitation is imposed on the material which makes up the edge-dam member. The material can be chosen as desired depending on the application purpose of the optical interconnection apparatus. In particular, however, nonwoven fabrics made of organic fibers such as polyethylene, polypropylene or nylon fibers, nonwoven fabric made of glass fibers, and sealing compounds (fillers) made of silicone, epoxy, urethane or acrylic resin can be suitably used. No limitation is imposed on the size or shape of the edge-dam member insofar as the resin material filled inside the edge-dam member does not flow out.

No particular limitation is imposed on the material forming the protective boots, insofar as the protective boots can play the role to protect the optical fibers at the end port sections. However, the material forming the protective boots is preferably the same as or similar to the material of the edge-dam member. Specifically, nonwoven fabrics made of organic fibers such as polyethylene, polypropylene or nylon fibers, nonwoven fabrics made of glass fibers, and sealing compounds (fillers) made of silicone, epoxy, urethane or acrylic resin can be suitably used.

No particular limitation is imposed on the material which makes up the protective resin layer, and gel-like or rubber-like organic materials, those classified as curable resins and having flexibility, such as ultraviolet-curing resins, electron beam curing resins and thermosetting resins, thermoplastic resins having flexibility, and the like can be used. More specifically, silicone gels, acrylic resin gels, fluorinated resin gels and the like can be mentioned as gel-like organic materials, and as rubber-like organic materials, silicone rubbers, urethane rubbers, fluorinated rubbers, acrylic rubbers, ethylene-acrylic rubbers, SBR, BR, NBR, chloroprene rubbers and the like can be mentioned. As curable resins having flexibility, epoxy resins, ultraviolet-curing resins, silicone resins and the like can be mentioned. As thermoplastic resins having flexibility, resins making up hot-melt adhesives, for example, polyvinyl acetate, acrylic resins such as polyethyl methacrylate, polyvinylidene chloride resin, polyvinyl butyral resins and polyamide resins can be mentioned.

Over a protective resin layer of the optical interconnection apparatus, a further protective layer may be arranged as needed. Where high flexibility is not required, the further protective layer can be the same one as the above-described base film on which the optical fibers are routed, and a sheet or plate made of an organic high molecular material, ceramic or the like can be used. Where the optical interconnection apparatus is required to be flexible, on the other hand, a silicone-based hard coating material or the like can be used as an illustrative protective layer of such hardness as not impairing the flexibility of the optical interconnection apparatus.

In the process of the present invention for the fabrication of the optical interconnection apparatus, the protective boots are formed on the edges of the main body of the optical interconnection apparatus. For interconnection with optical connectors, the optical fibers are generally designed to extend out from desired locations (ports) on the edges of the main body of the optical interconnection apparatus. The protective boots can therefore be formed at the end portions of the optical fibers at the edges of the optical interconnection apparatus. In the present invention, it is necessary that at least parts of the protective boots are formed at the same time as the formation of the edge-dam member. This makes it possible to increase their integrity as the optical interconnection apparatus, and also to permit the protective boots serving as reinforcing materials such that the protective boots protect the end portions of the optical fibers, said end portions extending out from the corresponding end port portions of the optical interconnection apparatus, and prevent their breakage by bending or the like. To form the protective boots, it is only necessary to provide the edge-dam member with protruding portions for forming the protective boots upon forming the edge-dam member along or in the vicinity of the peripheral edge of the base film for supporting the routed optical fibers.

A more specific description will next be made about fabrication processes of the above-described optical interconnection apparatuses according to the present invention. When the base film is included, for example, the above-described adhesive is coated either directly or in a form dissolved in a solvent onto one side of the base film to form an adhesive layer. For the adhesive layer, a suitable thickness can be chosen and used depending on the diameter of optical fibers to be routed. Its thickness is set generally in a range of from 1 ■ m to 1 mm, preferably from 5 to 500 ■ m, more preferably from 10 to 300 ■ m.

Optical fibers are routed in a desired pattern on the adhesive layer. The routing is conducted such that plural optical fibers have at least one type of parts selected from overlapping parts, curved parts or fiber pitch change parts. Here, terminals of the optical fibers are arranged extending out from the base film such that the terminals can serve as end portions adapted to permit optical interconnection with optical connectors or the like. Incidentally, the term "fiber pitch change part" as used herein means that at an input/output port section, its associated optical fibers are arranged at different pitches between on an input side and on an output side although they are arranged in the same order on both sides. For example, this term may mean such an arrangement that optical fibers routed at pitches of 500 ■ m on an input side but at pitches of 250 ■ m on an output side.

To provide a protective resin layer for holding in place and protecting the optical fibers routed as described above, it is only necessary to arrange the edge-dam member along or in the vicinity of the peripheral edge of the base film, to fill a resin material inside the edge-dam member, and then to solidify the resin material. For example, the protective resin layer can be formed by dissolving a resin material in a suitable solvent to form a coating material, pouring the coating material and then drying it, by pouring a resin material in a form molten under heat and allowing it to become a solid, by filling a resin material in a solid form, heating a resin material or the whole optical interconnection apparatus to cause the resin material to melt and then allowing it to become a solid, or by pouring a resin material, which is in a liquid form, and then subjecting it to cold curing, hot curing, moisture curing or the like.

Upon forming the above-described edge-dam member in the present invention, protruding portions which serve to form protective boots are arranged on the above-described edge-dam member such that the protruding portions cover the optical fibers located extending out from the corresponding end port sections of the main body of the optical interconnection apparatus. These protruding portions make it possible to form protective boots in a state integrated with the edge-dam member. Further, as is illustrated in FIG. 4, it is also possible to arrange protective boots at the end portions of the optical fibers as described above and then to additionally form protective boots on the back sides of the first-mentioned protective boots with a material which is the same as or similar to the material employed to form the first-mentioned protective boots.

Depending on the diameter of the routed optical fibers and the overlapped number of the routed optical fibers, a suitable thickness may be chosen for the protective resin layer with the optical fibers routed therein so that the optical fibers can be protected and held in place. In general, a thickness of (the diameter of optical fibers)×(the overlapped number of optical fibers) or greater is needed. For the protective resin layer without any optical fibers routed therein, on the other hand, a thickness of such an extent as reducing the stiffness of the base film may be chosen suitably depending on the application purpose of the optical interconnection apparatus. In general, the thickness is set within a range of from about 1 µm to 5 mm, preferably from 10 µm to 1 mm, more preferably from 30 µm to 500 µm.

When the optical interconnection apparatus includes no base film in the present invention, the optical fibers which are two-dimensionally arranged are in a form held in place and protected such that they are buried in the protective resin layer. As an illustrative fabrication process of such an embodiment, a release film is employed as a temporary support. An adhesive layer is formed over the release film in a similar manner as described above. On the adhesive layer, the optical fibers are routed such that their end portions are located extending out from the release film. An edge-dam member with protruding portions arranged thereon for the formation of protective boots is then formed along or in the vicinity of the peripheral edge of the release film in a similar manner as described above. A resin material is filled inside the edge-dam member to form a protective resin layer, whereby the optical fibers are held in place and protected. After the release film is removed, a resin protective layer made of the same resin material or a similar resin material is formed over the adhesive layer in a similar manner as described above such that the optical fibers are held in place and protected in an embedded state. In the above-described case, it is also possible to route additional plural optical fibers on the adhesive layer, which has been exposed as a result of the removal of the release film, and then form a protective resin layer over the additional plural optical fibers in a similar manner as described above.

As another illustrative process for fabricating an optical interconnection apparatus which includes no base film, an adhesive layer is formed in a similar manner as described above on a protective resin layer having flexibility. On the adhesive layer, the optical fibers are routed such that their end portions are located extending out from the protective resin layer. An edge-dam member with protruding portions arranged thereon for the formation of protective boots is then formed along or in the vicinity of the peripheral edge of the protective resin layer in a similar manner as described above. A resin material, which may be the same as or similar to the protective resin layer, is filled inside the edge-dam member to form a protective resin layer, whereby the optical fibers are held in place and protected.

In each optical interconnection apparatus of the present invention fabricated as described above, optical components such as optical connectors or optical modules are interconnected to end portions of the optical fibers, said end portions being located extending out from the optical interconnection apparatus. For example, the end portions of the optical fibers, which have been subjected to endface polishing to permit interconnection to optical connectors, are interconnected to the optical connectors, or endfaces of optical fibers held in place by optical connectors are arc-fusion-spliced with endfaces of end portions of the corresponding optical fibers, said end portions being located extending out from the optical interconnection apparatus. No particular limitation is imposed on the optical connectors interconnected to the optical interconnection apparatus according to the present invention, but optical single-fiber or multiple-fiber small connectors can be chosen suitably. Examples can include MPO optical connectors, MT optical connectors, MU optical connectors, FPC optical connectors [NTT R & D, 45, 6, 589], and V-grooved components useful for optical interconnections. Absolutely no particular limitation is imposed on the interconnection method of optical connectors.

In the optical interconnection apparatus fabricated by the process of the present invention, the protective boots and the edge-dam member are integrally arranged in the vicinity of the peripheral edge of the base film and also at the end portions of the corresponding optical fibers, said end portions being located extending out from the main body of the optical interconnection apparatus. The optical fibers are, therefore, provided with increased strength in the vicinity of the peripheral edge of the base film, so that the optical fibers have been rendered significantly resistant to breakage during work—such as endface polishing of the optical fibers for the interconnection of a connector, assembly of the connector onto the optical fibers after the endface polishing, and interconnection to another optical apparatus or to a connector attached to the optical apparatus—or to bending or other stress during handling of the optical interconnection apparatus. Accordingly, the optical fibers and the optical interconnection apparatus are protected from damage, and the optical interconnection apparatus can be easily handled in a simple manner.

As the material of the protective boots, use of the same material as or a material similar to the material of the edge-dam member is preferred, because the above-mentioned advantageous effects are particularly marked.

EXAMPLES

The present invention will hereinafter be described based on examples. It should however be borne in mind that the present invention shall not be limited to or by the following examples.

Example 1

"Colonate L" (1.0 part; trade name, product of Nippon Polyurethane Industry Co., Ltd.) was added to and mixed with 100 parts of a 30% ethyl acetate solution of an acrylic resin composed of an n-butyl acrylate/methyl acrylate/acrylic acid/2-hydroxyethyl methacrylate copolymer (=82/15/2.7/0.3), whereby a coating material of the acrylic pressure-sensitive adhesive was obtained. The coating material was then applied onto one side of a polyimide film having a thickness of 125 µm to give a dry coat thickness of 100 µm, whereby a base film (size: 120 mm×100 mm) with a pressure-sensitive adhesive layer formed thereon was provided. On the pressure-sensitive adhesive layer of the base film, optical fibers (manufactured by The Furukawa Electric Co., Ltd.; 250 µm in diameter) were routed per port (an exit of optical fibers from an optical interconnection apparatus) as will be described next. Described specifically, 4 optical fibers were arranged in parallel with each other at pitches of 250 µm, and 4 ports (each port was formed of 4 optical fibers) were formed at pitches of 30 mm on each of opposite longer sides of the polyimide film. Each optical fiber was routed extending from one of the longer sides of the polyimide film to the other longer side. The routing to the individual ports on the opposite sides was designed to adjust overlapping parts of the individual optical fibers such that the maximum overlapped number of optical fibers is limited at 3.

On and along a peripheral edge portion of the polyimide film with the optical fibers routed thereon, an edge-dam member of 5 mm in width and 1 mm in height was formed by using a nonwoven fabric formed of polypropylene fibers ("P100SW-00X", trade name; product of Tonen Tapyrus Co., Ltd.). The edge-dam member was provided, at portions thereof corresponding to the individual ports from which the optical fibers extended respectively, with protruding portions along the optical fibers located extending out from the ports. Those protruding portions were made of the same nonwoven fabric, were 1.5 mm in width, 5 mm in length and 1 mm in thickness, and were used as protective boots. A silicone gel coating material ("SE-1880", trade name; product of Dow Corning Toray Silicone Co., Ltd.) was then poured inside the edge-dam member, and the silicone gel was cured at 120° for 1 hour to form a protective resin layer such that the optical fibers were held in place by the protective resin layer. An optical circuit board of 1.2 mm in thickness was hence fabricated.

As the non-woven fabric was impregnated with the silicone gel coating material, the protective resin layer, the edge-dam member and the protective boots were formed as an integral unit in the optical circuit board, so that the protective boots were provided with further increased strength. The outwardly-extending portions of the optical fibers were attached to 4-fiber MT connectors, respectively, and were polished at endfaces thereof. Owing to the increased strength of the optical fibers in the vicinity of the edges of the optical circuit boards, it was possible to polish their endfaces without breakage of the optical fibers. The MT connectors were also interconnected to other 4-fiber MT connectors, respectively. Interconnections were feasible without breakage of the optical fibers. Further, the outwardly-extending portions of the optical circuit board were bent while holding the connectors. Owing to the provision of the protective boots, the end portions of the optical fibers, said end portions being located in the vicinity of the corresponding edges of the optical circuit board, and the optical circuit board remained united, whereby the end portions of the optical fibers presented smooth circular arc bends. No excessive force was therefore applied to the end portions of the optical fibers, said end portions being located extending out form the optical circuit board, so that the optical fibers were provided with increased strength against bending.

Further, optical losses of all the interconnected optical fibers were measured. They were found to be 0.4 dB or less, including losses of interconnections to the corresponding optical connectors. With respect to the optical circuit board so fabricated, there were conducted a damp heat test (the board was left over for 5,000 hours at 75° and 90% RH) and a heat cyclic test (−40° to 75°, 500 cycles). Variations and fluctuations in optical loss were both 0.6 dB or less. The optical circuit board was therefore found to be satisfactorily usable as an optical interconnection apparatus.

Example 2

A first protective resin layer was arranged in a similar manner as in Example 1 except that a silicone rubber coating material ("KE45-T", trade name; product of Shin-Etsu Chemical Co., Ltd.) was used to form an edge-dam member instead of using the nonwoven fabric formed of polypropylene fibers and that the protective resin layer was formed by using a silicone rubber coating material ("TSE 399", trade name; product of Toshiba Silicone Co., Ltd.) as a material for forming the protective resin layer, pouring the silicone rubber coating material and curing it at 25° for 24 hours. Upon formation of the edge-dam member, however, measures were taken as will be described next. Namely, the edge-dam member of 1.5 mm in width and 1mm in height was formed using the silicone rubber coating material ("KE45-T", trade name; product of Shin-Etsu Chemical Co., Ltd.). The edge-dam member was provided, at portions thereof corresponding to the individual ports from which the optical fibers extended respectively, with protruding portions along the optical fibers located extending out from the ports. Those protruding portions were made of the same silicone rubber, were 1.5 mm in width, 5 mm in length and 1 mm in height, and were used as protective boots.

A second protective resin layer was then formed on the opposite side of the polyimide film. Described specifically, an edge-dam member of 0.6 mm in width and 0.3 mm in height was formed on and along the peripheral edge portion of the polyimide film by using the silicone rubber coating material("KE45-T", trade name; product of Shin-Etsu Chemical Co., Ltd.). Here again, the edge-dam member was provided, at portions thereof corresponding to the individual ports from which the optical fibers extended respectively, with protruding portions along the optical fibers located extending out from the ports. Those protruding portions were made of the same silicone rubber coating material ("KE45-T", trade name; product of Shin-Etsu Chemical Co., Ltd.), were 1.5 mm in width, 5 mm in length and 0.3 mm in height, and were used as protective boots. The silicone rubber coating material ("TSE 399", trade name; product of Toshiba Silicone Co., Ltd.) was then poured inside the edge-dam member, and the silicone rubber was at 25' for 24 hours to form a second protective resin layer. An optical circuit board of 1.5 mm in thickness was therefore fabricated.

On each side of the polyimide film in this optical circuit board, the edge-dam member and its corresponding protective boots were concurrently formed with the same silicone rubber. The protective boots were arranged on both sides of the optical fibers. The optical fibers were covered by the protective boots, and the edge-dam members and the protective boots were formed as an integral unit, so that the protective boots were provided with further increased strength. The outwardly-extending portions of the optical fibers were attached to 4-fiber MPO connectors, respectively, and were polished at endfaces thereof. It was therefore possible to polish their endfaces without breakage of the optical fibers in the vicinity of the edges of the optical circuit board. The MPO connectors were also interconnected to other 4-fiber MPO connectors, respectively. Interconnections were likewise feasible without breakage of the optical fibers. Further, the outwardly-extending portions of the optical circuit board were bent while holding the connectors. Owing to the provision of the protective boots, the end portions of the optical fibers, said end portions being located in the vicinity of the corresponding edges of the optical circuit board, and the optical circuit board remained united, whereby the end portions of the optical fibers presented smooth circular arc bends. No excessive force was therefore applied to the end portions of the optical fibers, said end portions being located extending out form the optical circuit board, so that the optical fibers were provided with increased strength against bending.

Further, optical losses of all the interconnected optical fibers were measured. They were found to be 0.4 dB or less, including losses of interconnections to the corresponding optical connectors. With respect to the optical circuit board so fabricated, there were conducted a damp heat test (the board was left over for 5,000 hours at 75° and 90% RH) and a heat cyclic test (−40° to 75°, 500 cycles). Variations and fluctuations in optical loss were both 0.6 dB or less. The optical circuit board was therefore found to be satisfactorily usable as an optical interconnection apparatus.

Example 3

An optical circuit board provided with a first protective resin layer was fabricated in a similar manner as in Example 2. After that, protective boots were also formed on back sides of portions of optical fibers, said portions being located extending out from the optical circuit board. Described specifically, protective boots which were made of the silicone rubber and were 1.5 mm in width, 5 mm in length and 1 mm in thickness were formed at locations, which correspond to the individual ports from which the optical fibers extended respectively, with the silicone rubber coating material ("KE45-T", trade name; product of Shin-Etsu Chemical Co., Ltd.) such that the protective boots are arranged on and along the corresponding optical fibers located extending out from the corresponding edges of the base film.

On each side of the polyimide film in this optical circuit board, the edge-dam member and its corresponding protective boots were concurrently formed at the same time with the same silicone rubber. The protective boots were arranged on both sides of the optical fibers. The optical fibers were covered by the protective boots so that the protective boots were provided with further increased strength. The outwardly-extending portions of the optical fibers were attached to 4-fiber MPO connectors, respectively, and were polished at endfaces thereof. It was therefore possible to polish their endfaces without breakage of the optical fibers in the vicinity of the edges of the optical circuit board. The MPO connectors were also interconnected to other 4-fiber MPO connectors, respectively. Interconnections were likewise feasible without breakage of the optical fibers. Further, the outwardly-extending portions of the optical circuit board were bent while holding the connectors. Owing to the provision of the protective boots, the end portions of the optical fibers, said end portions being located in the vicinity of the corresponding edges of the optical circuit board, and the optical circuit board remained united, whereby the end portions of the optical fibers presented smooth circular arc bends. No excessive force was therefore applied to the end portions of the optical fibers, said end.portions being located extending out form the optical circuit board, so that the optical fibers were provided with increased strength against bending.

Further, optical losses of all the interconnected optical fibers were measured. They were found to be 0.4 dB or less, including losses of interconnections to the corresponding optical connectors. With respect to the optical circuit board so fabricated, there were conducted a damp heat test (the board was left over for 5,000 hours at 75° and 90% RH) and a heat cyclic test (−40° to 75°, 500 cycles). Variations and fluctuations in optical loss were both 0.6 dB or less. The optical circuit board was therefore found to be satisfactorily usable as an optical interconnection apparatus.

Example 4

A base film, which was formed of a release film and a silicone-base pressure-sensitive adhesive layer formed thereon to give a dry film thickness of 100μ base pressure-sensitive adhesive coating material composed of "SD4592"/ "BY24-741"/"SRX212"/toluene (=100/1.0/0.9/50 (parts by weight)) (all, trade names; products of Dow Corning Toray Silicone Co., Ltd.) was used in place of the acrylic pressure-sensitive adhesive coating material and that a silicone-base release film of 75 ■ m in thickness was used in lieu of the polyimide film of 125 ■ m in thickness. In a similar manner as in Example 1, optical fibers were then routed on the pressure-sensitive adhesive sheet so prepared.

On and along a peripheral edge portion of the release film with the optical fibers routed thereon, an edge-dam member of 1.5 mm in width and 1 mm in height was formed by using a silicone-base filler ("BATH BOND", trade mark; product of KONISHI CO., LTD.). The edge-dam member was provided, at portions corresponding to the individual ports from which the optical fibers extended respectively, with protruding portions along the optical fibers located extending out from the ports. Those protruding portions were made of the same silicone-base filler ("BATH BOND", trade mark; product of KONISHI CO., LTD.), were 1.5 mm in width, 5 mm in length and 1 mm in thickness, and were used as protective boots. A silicone rubber coating material ("TSE399", trade name; product of Toshiba Silicone Co., Ltd.) was then poured inside the edge-dam member, and the silicone rubber was cured at 25 for 24 hours to form a first protective resin layer such that the optical fibers were held in place by the protective resin layer.

The release film on the back side of the protective resin layer was then peeled off, and on the pressure sensitive adhesive layer so exposed, a second protective layer was formed. Described specifically, the silicone-base filler ("BATH BOND", trade mark; product of KONISHI CO., LTD.) was coated on and along a peripheral edge portion of the exposed pressure-sensitive adhesive layer, whereby an edge-dam member of 0.6 mm in width and 0.3 mm in thickness was formed. Here again, the edge-dam member was provided, at portions corresponding to the individual ports from which the optical fibers extended respectively, with protruding portions along the optical fibers located extending out from the ports. Those protruding portions were made of the same silicone-base filler ("BATH BOND", trade mark; product of KONISHI CO., LTD.), were 1.5 mm in width, 5 mm in length and 0.3 mm in thickness, and were used as protective boots. A silicone rubber coating material ("TSE399", trade name; product of Toshiba Silicone Co., Ltd.) was then poured inside the edge-dam member, and the silicone rubber was cured at 25° for 24 hours to form a second protective resin layer. An optical circuit board of 1.8 mm in thickness was therefore fabricated.

The edge-dam member and its corresponding protective boots were concurrently formed with the same silicone rubber, and the protective boots are arranged on both sides of the optical fibers. The outwardly-extending portions of the optical fibers were covered by the protective boots, and the edge-dam members and the protective boots were integrally formed. The protective boots were provided with further increased strength. The outwardly-extending portions of the optical fibers were attached to 4-fiber MT connectors, respectively, and were polished at endfaces thereof. It was possible to polish their endfaces without breakage of the optical fibers in the vicinity of the edges of the optical circuit boards. The MT connectors were also interconnected to other 4-fiber MT connectors, respectively. Interconnections were feasible without breakage of the optical fibers. Further, the outwardly-extending portions of the optical circuit board were bent while holding the connectors. Owing to the provision of the protective boots, the end portions of the optical fibers, said end portions being located in the vicinity of the corresponding edges of the optical circuit board, and the optical circuit board remained united, whereby the end portions of the optical fibers presented smooth circular arc bends. No excessive force was therefore applied to the end portions of the optical fibers, said end portions being located extending out form the optical circuit board, so that the optical fibers were provided with increased strength against bending.

Further, optical losses of all the interconnected optical fibers were measured. They were found to be 0.5 dB or less, including losses of interconnections to the corresponding optical connectors. With respect to the optical circuit board so fabricated, there were conducted a damp heat test (the board was left over for 5,000 hours at 75° and 90% RH) and a heat cyclic test (−40° to 75°, 500 cycles). Variations and fluctuations in optical loss were both 0.8 dB or less. The optical circuit board was therefore found to be satisfactorily usable as an optical interconnection apparatus.

What is claimed is:

1. A process for the fabrication of an optical interconnection apparatus having: plural optical fibers provided at ports of the optical interconnection apparatus, the plural optical fibers having end portions for optical interconnection with other devices, the plural optical fibers being routed in a two-dimensional plane such that a routing pattern having at least one type of part selected from the group consisting of overlapping parts, curved parts and fiber pitch change parts is formed on a base film of said optical interconnection apparatus, and said end portions of said optical fibers are located extending out from the ports of said optical interconnection apparatus and are protected by protective boots, the process for fabrication comprising the steps of:

forming an edge-dam member, which is provided with protruding portions for forming protective boots, along or in a vicinity of a peripheral edge of a base film for supporting the thus-routed optical fibers thereon; and filling a resin material inside of said edge-dam member such that a protective resin layer is formed to hold said optical fibers in place and said protective boots are formed on said end portions of said optical fibers.

2. A process according to claim 1, wherein said protruding portions for forming said protective boots are made of the same material as said edge-dam member.

3. A process according to claim 1, wherein said protruding portions for forming said protective boots are made of a non-woven fabric formed of organic fibers or a non-woven fabric formed of glass fibers.

4. A process according to claim 1, wherein said protruding portions for forming said protective boots are made of a sealing compound comprising a silicone, epoxy, urethane or acrylic resin.

5. A process according to claim 1, further comprising the step of: forming another edge-dam member, which is provided with protruding portions for forming additional protective boots, along or in the vicinity of another peripheral edge of the base film on which the plural optical fibers are arranged via an adhesive layer.

6. A process according to claim 5, wherein said protruding portions for forming said additional protective boots are made of the same material as said another edge-dam member.

7. A process according to claim 5, wherein said protruding portions for forming said additional protective boots are made of a non-woven fabric formed of organic fibers or a non-woven fabric formed of glass fibers.

8. A process according to claim 5, wherein said protruding portions for forming said additional protective boots are made of a sealing compound comprising a silicone, epoxy, urethane or acrylic resin.

9. A process for the fabrication of an optical interconnection apparatus having: plural optical fibers provided at ports of the optical interconnection apparatus, the plural optical fibers having end portions for optical interconnection with other devices, the plural optical fibers being routed in a two-dimensional plane such that a routing pattern having at least one type of part selected from the group consisting of overlapping parts, curved parts and fiber pitch change parts is formed on a base film of said optical interconnection apparatus, and said end portions of said optical fibers are located extending out from the ports of said optical interconnection apparatus and are protected by protective boots, the process for fabrication comprising the steps of:

routing plural optical fibers on a release film on which an adhesive layer is provided, such that their end portions are located extending out from the release film, forming an edge-dam member, which is provided with protruding portions for forming protective boots, along or in the vicinity of the peripheral edge of the release film, filling a resin material inside of said edge-dam member such that a protective resin layer is formed to hold said optical fibers in place, removing said release film, thereby exposing the adhesive layer; and forming a protective resin layer on the exposed adhesive layer.

10. A process according to claim 9, wherein said protruding portions for forming said protective boots are made of the same material as said edge-dam member.

11. A process according to claim 9, wherein said protruding portions for forming said protective boots are made of a non-woven fabric formed of organic fibers or a non-woven fabric formed of glass fibers.

12. A process according to claim 9, wherein said protruding portions for forming said protective boots are made of a sealing compound comprising a silicone, epoxy, urethane or acrylic resin.

* * * * *

UNITED STATES PATENT AND TRADEMARK OFFICE
CERTIFICATE OF CORRECTION

PATENT NO.    : 6,519,407 B1
DATED         : February 11, 2003
INVENTOR(S)   : Ritsu Kawase et al.

It is certified that error appears in the above-identified patent and that said Letters Patent is hereby corrected as shown below:

Column 6,
Line 25, change "1 m" to -- 1 $\mu$m --
Lines 25 and 40, change "500 m" to -- 500 $\mu$m --
Line 26, change "300 m" to -- 300 $\mu$m --
Line 41, change "250 m" to -- 250 $\mu$m --

Column 7,
Line 18, change "m" to -- $\mu$m --
Line 18, change "10 m" to -- 10 $\mu$m --
Line 19, change "30 m" to -- 30 $\mu$m --
Line 19, change "500 m" to -- 500 $\mu$m --

Column 8,
Line 57, change "125 m" to -- 125 $\mu$m --
Line 58, change "100 m" to -- 100 $\mu$m --
Lines 62 and 66, change "250 m" to -- 250 $\mu$m --

Column 9,
Line 23, change "120°" to -- 120°C --
Line 58, change "75°" to -- 75°C --
Line 59, change "–40° to 75°" to -- –40°C to 75°C --

Column 10,
Lines 8 and 38, change "25°" to -- 25°C --

Column 11,
Lines 8 and 60, change "75°" to -- 75°C --
Lines 9 and 61, change "–40° to 75°" to -- –40°C to 75°C --

Column 12,
Line 7, change "75 m" to -- 75 $\mu$m --
Line 8, change "125 m" to -- 125 $\mu$m --
Lines 26 and 48, change "25°" to -- 25°C --

UNITED STATES PATENT AND TRADEMARK OFFICE
CERTIFICATE OF CORRECTION

PATENT NO.   : 6,519,407 B1
DATED        : February 11, 2003
INVENTOR(S)  : Ritsu Kawase et al.

It is certified that error appears in the above-identified patent and that said Letters Patent is hereby corrected as shown below:

<u>Column 13,</u>
Line 16, change "75°" to -- 75°C --
Line 17, change "–40° to 75°" to -- –40°C to 75°C --

Signed and Sealed this

Tenth Day of June, 2003

JAMES E. ROGAN
*Director of the United States Patent and Trademark Office*